United States Patent
Bill (10) Patent No.: US 12,023,968 B2
(45) Date of Patent: Jul. 2, 2024

(54) INITIALISATION OF TYRE MONITORING DEVICES

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 13 days.

(21) Appl. No.: 17/418,166

(22) PCT Filed: Jun. 16, 2020

(86) PCT No.: PCT/EP2020/066540
§ 371 (c)(1),
(2) Date: Jun. 24, 2021

(87) PCT Pub. No.: WO2020/254273
PCT Pub. Date: Dec. 24, 2020

(65) Prior Publication Data
US 2022/0055421 A1 Feb. 24, 2022

(30) Foreign Application Priority Data
Jun. 17, 2019 (GB) .................................... 1908643

(51) Int. Cl.
*B60C 23/04* (2006.01)

(52) U.S. Cl.
CPC ...... *B60C 23/0471* (2013.01); *B60C 23/0454* (2013.01); *B60C 23/0479* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

2002/0030592 A1  3/2002 Hakanen et al.
2002/0177406 A1  11/2002 O'Connor et al.
(Continued)

FOREIGN PATENT DOCUMENTS

CN   1784318 A   6/2006
CN   201961113 U   9/2011
(Continued)

OTHER PUBLICATIONS

International Search Report for PCT/EP2020/066540 dated Sep. 28, 2020, 3 pages.
(Continued)

*Primary Examiner* — Andre J Allen
(74) *Attorney, Agent, or Firm* — Nixon & Vanderhye P.C.

(57) ABSTRACT

A method for initialising a tyre monitoring device including a wireless communication interface and tyre monitoring devices and systems using the method are disclosed. The method includes operating the tyre monitoring device in a first mode, in the first mode the tyre monitoring device is only responsive to an initialisation instruction received over the wireless communication interface from the second device; receiving an initialisation instruction over the wireless communication interface while operating in the first mode; and, responsive to the initialisation instruction, operating the tyre monitoring device in a second mode in which the tyre monitoring device is responsive to instructions received over the wireless communication interface. The first mode draws lower power than the second mode so power draw prior to initialisation, for example while storage awaiting use, is reduced.

24 Claims, 7 Drawing Sheets

(52) U.S. Cl.
CPC ........ *B60C 23/0428* (2013.01); *B60C 23/045* (2013.01); *B60C 23/0481* (2013.01); *B60C 2200/02* (2013.01)

(58) Field of Classification Search
CPC . B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0449; B60C 23/0427; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 17/00; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC ................................................ 73/146–146.8
See application file for complete search history.

(56) References Cited

U.S. PATENT DOCUMENTS

| | | |
|---|---|---|
| 2005/0110623 A1 | 5/2005 | Schulze et al. |
| 2006/0192438 A1 | 8/2006 | Hattori |
| 2006/0220805 A1 | 10/2006 | Thomas et al. |
| 2006/0290485 A1 | 12/2006 | Watabe |
| 2007/0068240 A1 | 3/2007 | Watabe |
| 2008/0018448 A1 | 1/2008 | Ghabra et al. |

(56) References Cited

U.S. PATENT DOCUMENTS

| | | | |
|---|---|---|---|
| 2012/0007730 A1 | 1/2012 | Vecht-Lifshitz et al. | |
| 2012/0166836 A1* | 6/2012 | Hardman | B60C 23/0461 713/320 |
| 2014/0111326 A1 | 4/2014 | Borisenko | |
| 2017/0036499 A1 | 2/2017 | McIntyre | |
| 2017/0190225 A1 | 7/2017 | Yu et al. | |
| 2017/0316623 A1 | 11/2017 | Godet et al. | |
| 2019/0184772 A1 | 6/2019 | Bill et al. | |
| 2019/0225034 A1* | 7/2019 | Van Wiemeersch | B60C 23/0479 |
| 2022/0055423 A1* | 2/2022 | Bill | B60C 23/0479 |
| 2022/0185041 A1* | 6/2022 | Bill | G05B 23/0283 |

FOREIGN PATENT DOCUMENTS

| | | |
|---|---|---|
| CN | 103587357 | 2/2014 |
| CN | 104070943 A | 10/2014 |
| CN | 204161008 U | 2/2015 |
| CN | 106274307 | 1/2017 |
| CN | 106994869 A | 8/2017 |
| CN | 107009828 | 8/2017 |
| CN | 107015838 | 8/2017 |
| CN | 107187280 A | 9/2017 |
| CN | 206664171 | 11/2017 |
| CN | 108128104 | 6/2018 |
| CN | 108566407 | 9/2018 |
| EP | 2 910 393 | 8/2015 |
| EP | 3517325 | 7/2019 |
| JP | 2016-078488 | 5/2016 | |
| WO | 94/18017 A1 | 8/1994 | |
| WO | 03016079 | 2/2003 | |
| WO | 2011061574 | 5/2011 | |
| WO | 2019106828 | 6/2019 | |
| WO | WO-2020254278 A1 * | 12/2020 | B60C 23/0454 |
| WO | WO-2020254282 A1 * | 12/2020 | B60C 23/04 |

OTHER PUBLICATIONS

Written Opinion of the ISA for PCT/EP2020/066540 dated Sep. 28, 2020, 7 pages.

Combined Search and Examination Report for GB1908643.8 dated Oct. 24, 2019, 9 pages.

International Search Report cited in PCT/EP2020/066547 dated Sep. 28, 2020, 3 pages.

Chinese Office Action cited in CN 202080006995.6 dated May 17, 2023, 7 pages.

Chinese Office Action and Machine English Translation for Application No. 202080006995.6, twenty pages, dated Feb. 7, 2024.

Chinese Office Action and English Machine Translation for Application No. 202080006998.X, twenty four pages, dated Dec. 15, 2023.

Office Action for Chinese Application No. 202080006998.X, and English Machine Translation, eighteen (18) pages, dated May 10, 2024.

Notice of Allowance for Chinese Application No. 202080006995.6, and English Machine Translation, eight (8) pages, dated May 2, 2024.

* cited by examiner

INITIALISATION OF TYRE MONITORING DEVICES

CROSS REFERENCE TO RELATED APPLICATIONS

The present application is a National Phase of International Application Number PCT/EP2020/066540 filed Jun. 16, 2020, which designated the U.S. and claims priority benefits from Great Britain Application Number GB 1908643.8 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading, but can still take time due to a requirement to travel from wheel to wheel measuring the pressures.

It would be desirable to provide a tyre pressure measurement system which addresses some, or all, of these points.

SUMMARY

According to a first aspect, there is provided a method for initialising a tyre monitoring device comprising a wireless communication interface. The method comprises: operating the tyre monitoring device in a first mode, wherein in the first mode the tyre monitoring device is only responsive to an initialisation instruction received over the wireless communication interface from the second device; receiving an initialisation instruction over the wireless communication interface while operating in the first mode; and responsive to the initialisation instruction operating the tyre monitoring device in a second mode in which the tyre monitoring device is responsive to instructions received over the wireless communication interface; wherein the first mode draws lower power than the second mode.

Optionally, when operating in the first mode, power is restricted to at least one component of the tyre monitoring device.

Optionally, restricting the power comprises providing no power to the at least one component.

Optionally, the tyre monitoring device comprises a counter and, when operating in first mode, the counter is not powered, the method further comprising initialising the counter responsive to the initialisation instruction and powering the counter in the second mode.

Optionally, the tyre monitoring device comprises a counter and, when operating in the first mode, the counter is powered, the method further comprises stopping or terminating the counter responsive to the initialisation instruction. Optionally power may also be removed from the counter while in the second mode.

Optionally, when operating in the first mode, the initialisation instruction is received using a first wireless communication protocol and, when operating in the second mode, the instructions are received using a second wireless communication protocol, wherein the first wireless communication protocol has a lower energy requirement than the second wireless communication protocol.

Optionally, the first wireless communication protocol is a passive wireless communication protocol and the second wireless communication protocol is an active wireless communication protocol.

Optionally, the first wireless communication protocol uses a first wireless communication interface and the second wireless communication protocol uses a second wireless communication interface.

Optionally, when in the first mode, the wireless communication interface has a communication range of less than 10 cm and the second mode the wireless less communication interface a communication range of at least 20 m.

Optionally, once the tyre monitoring device is operating in the second mode, it is not possible for the tyre monitoring device to return to operating in the first mode.

Optionally, when the tyre monitoring device is operating in the second mode, the tyre monitoring device is arranged to return to operating in the first mode upon detection of a fault According to a second aspect. an aircraft tyre monitoring device is provided which comprises: a wireless communication interface; and a processing system configured to execute the method as described above, with or without any of the optional features also described.

According to a third aspect, there is provided an aircraft tyre monitoring device configured to be mounted on a wheel of an aircraft. The tyre monitoring device comprises: a wireless communication interface; an indicator; a pressure sensor; a temperature sensor; a processing system; and a power supply. The tyre monitoring device is configured to: operate in a storage mode in which at least one of the indicator, the pressure sensor; the temperature sensor and the processing system cannot be used and the tyre monitoring device is only responsive to an initialisation instruction received over the wireless communication interface; and operate in a normal mode in response to receipt of the initialisation instruction, wherein in the normal mode, the indicator, the pressure sensor; the temperature sensor and the processing system can be used and the tyre monitoring device is responsive to instructions received over the wireless communication interface, the storage mode having a lower power requirement than the normal mode.

Optionally, the wireless communication interface comprises: a first wireless communication interface operative in both the storage mode and the normal mode and having a communication range of less than 10 cm; and a second wireless communication interface operative only in the normal mode and having a communication range of at least 20 m, wherein the first wireless communication interface has a lower energy requirement than the second wireless communication interface.

Optionally, the aircraft tyre monitoring device further comprises a counter, and wherein the tyre monitoring device is configured to: not power the counter in the storage mode;

power the counter in the normal mode; and responsive to the initialization instruction, initialize the counter.

Optionally, the aircraft tyre monitoring device further comprises a counter, and wherein the tyre monitoring device is configured to: power the counter in the storage mode; not power the counter in the normal mode; and responsive to the initialization instruction, disable the counter.

Optionally, the aircraft tyre monitoring device cannot return to operation in the storage mode once it is operating in the normal mode.

Optionally, the aircraft tyre monitoring device returns to operation in the storage mode upon detection of a fault.

According to a fourth aspect, there is provided a tyre monitoring system comprising: a plurality of tyre monitoring devices each comprising a wireless communication interface; and a configuration device comprising a wireless communication interface. The plurality of tyre monitoring devices are responsive to an initialization command sent by the configuration device over the wireless communication interface to transition from a power-saving storage mode to a normal operation mode.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, tyre monitoring devices and methods of operating tyre monitoring devices are provided in which a tyre monitoring device is operated in a first mode or storage mode with lower power draw than a second mode or normal operation mode. This allows power to be saved before the tyre monitoring device is installed on a vehicle. For example, a tyre monitoring device may include a power supply, such as a power source with a fixed amount of energy to be used over a predetermined time before replacing the power source or the device itself, if the power source is not replaceable. When the power supply is depleted, the tyre monitoring device must be replaced. It is likely that tyre monitoring devices will spend some time in storage between manufacture and first installation on a wheel. This may range from a few weeks to several years, perhaps three years or more for spares purchased at the same time as other tyre monitoring devices are installed, if those spares are not required until replacement of the tyre monitoring devices is required at the end of their normal operating life. This storage period may reduce the energy in the power supply so that the service life is reduced, it would desirable to reduce power draw in storage.

Example Tyre Monitoring System

Figure 1:
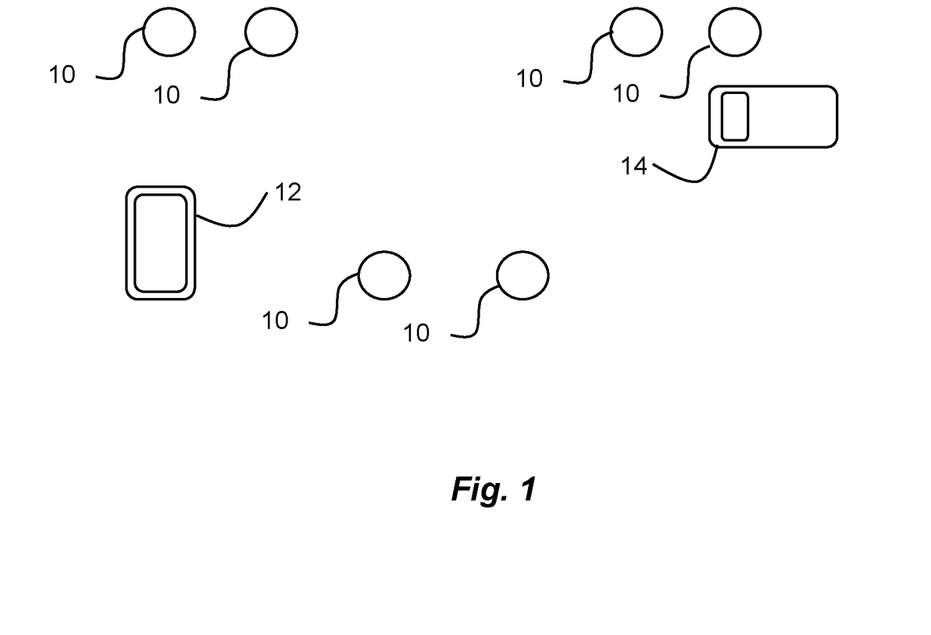
FIG. 1 shows a schematic representation of a tyre monitoring system according to a first example of the invention.

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
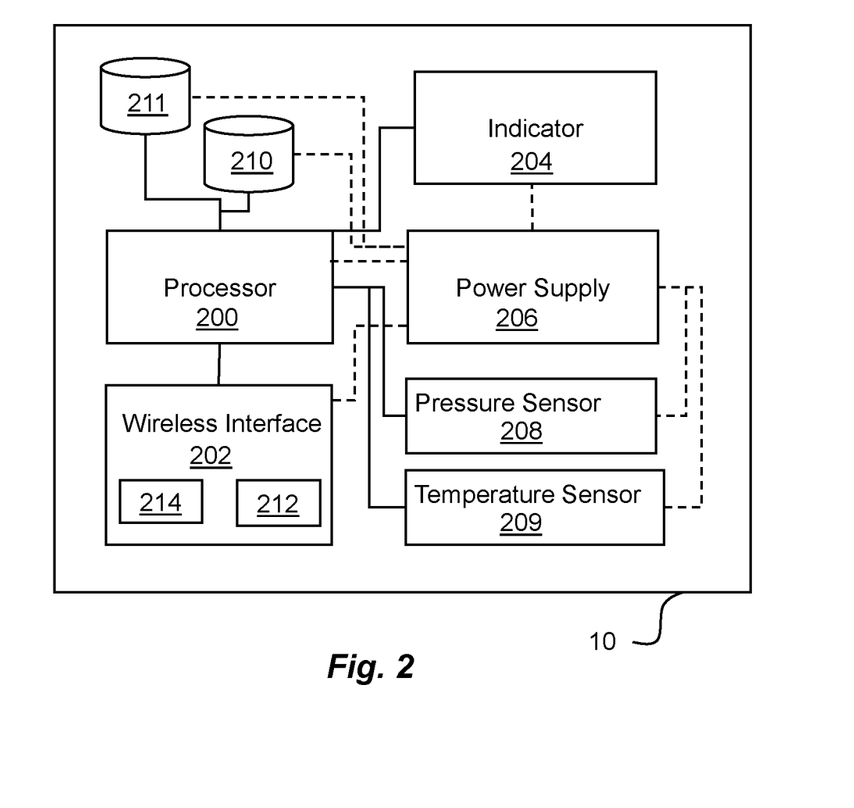
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre.

The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
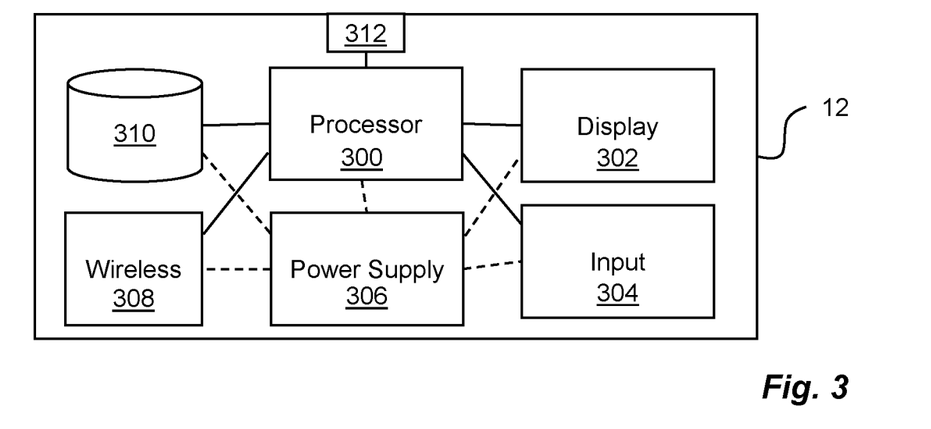
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi 33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
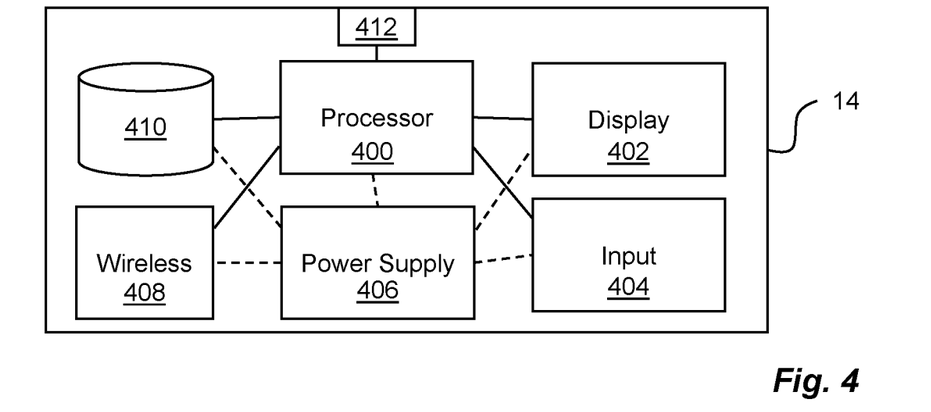
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
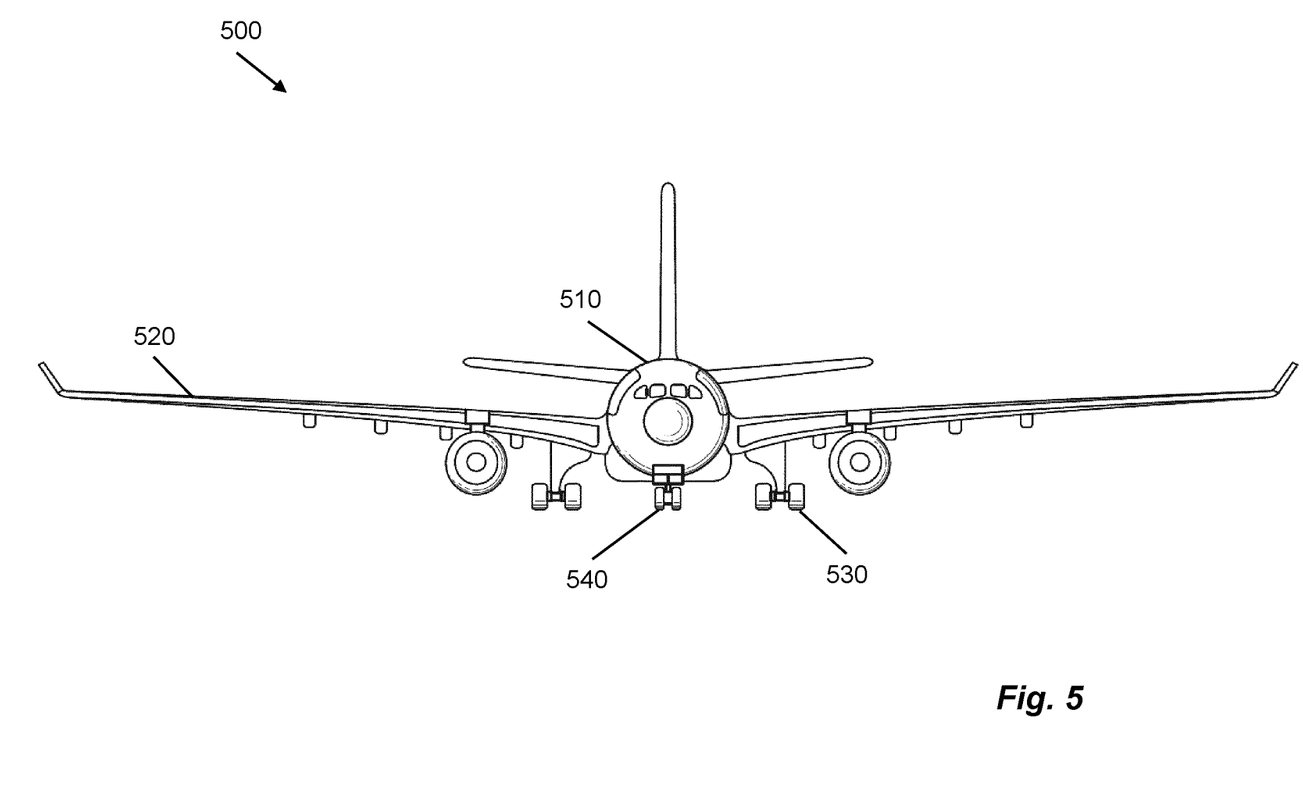
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
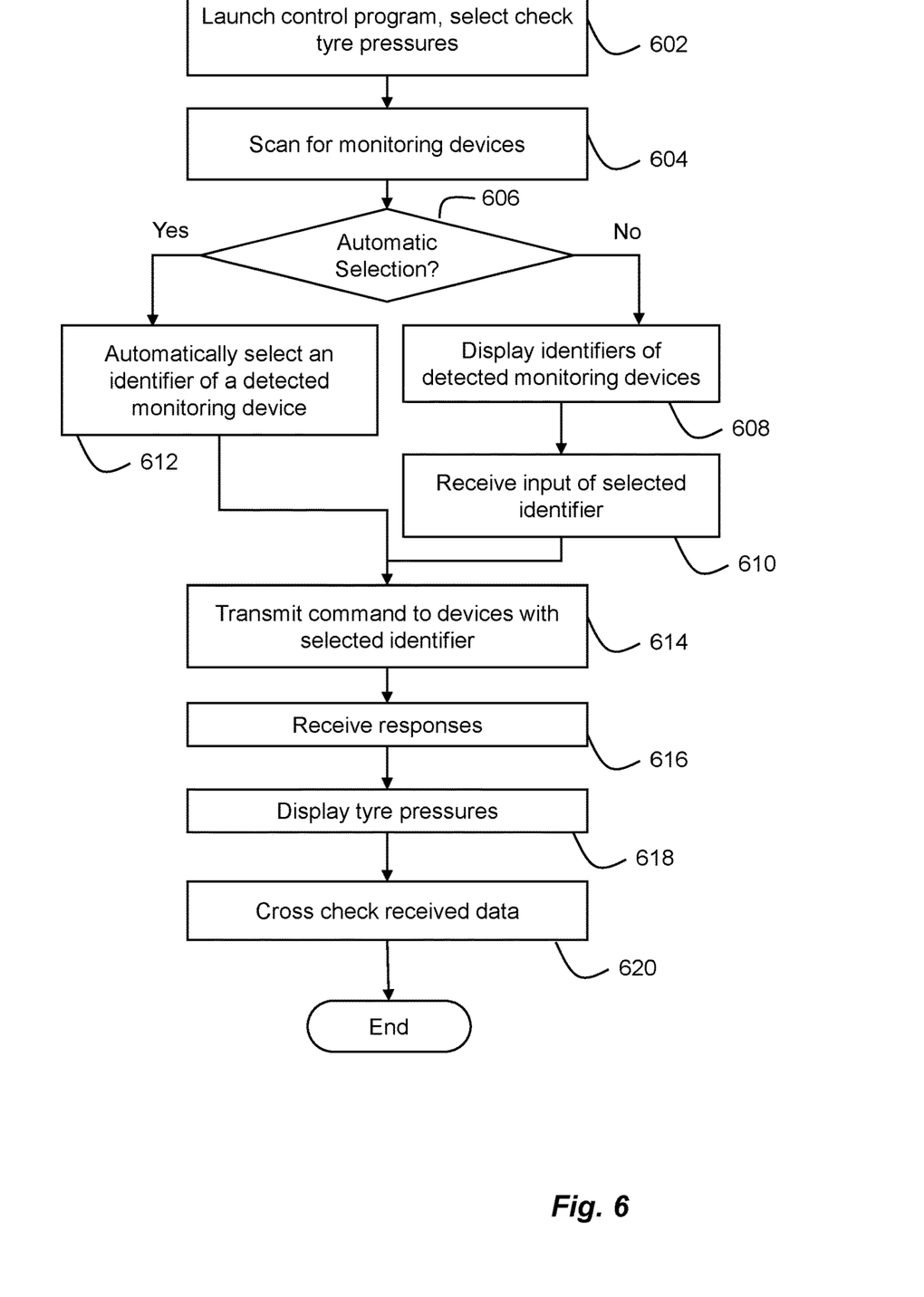
FIG. 6 shows a flow chart of a tyre pressure check process that can be used with the example of FIG. 1.

FIG. 6 shows a flow chart of a tyre pressure check process that can be used with the example of FIG. 1. First, at block

602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
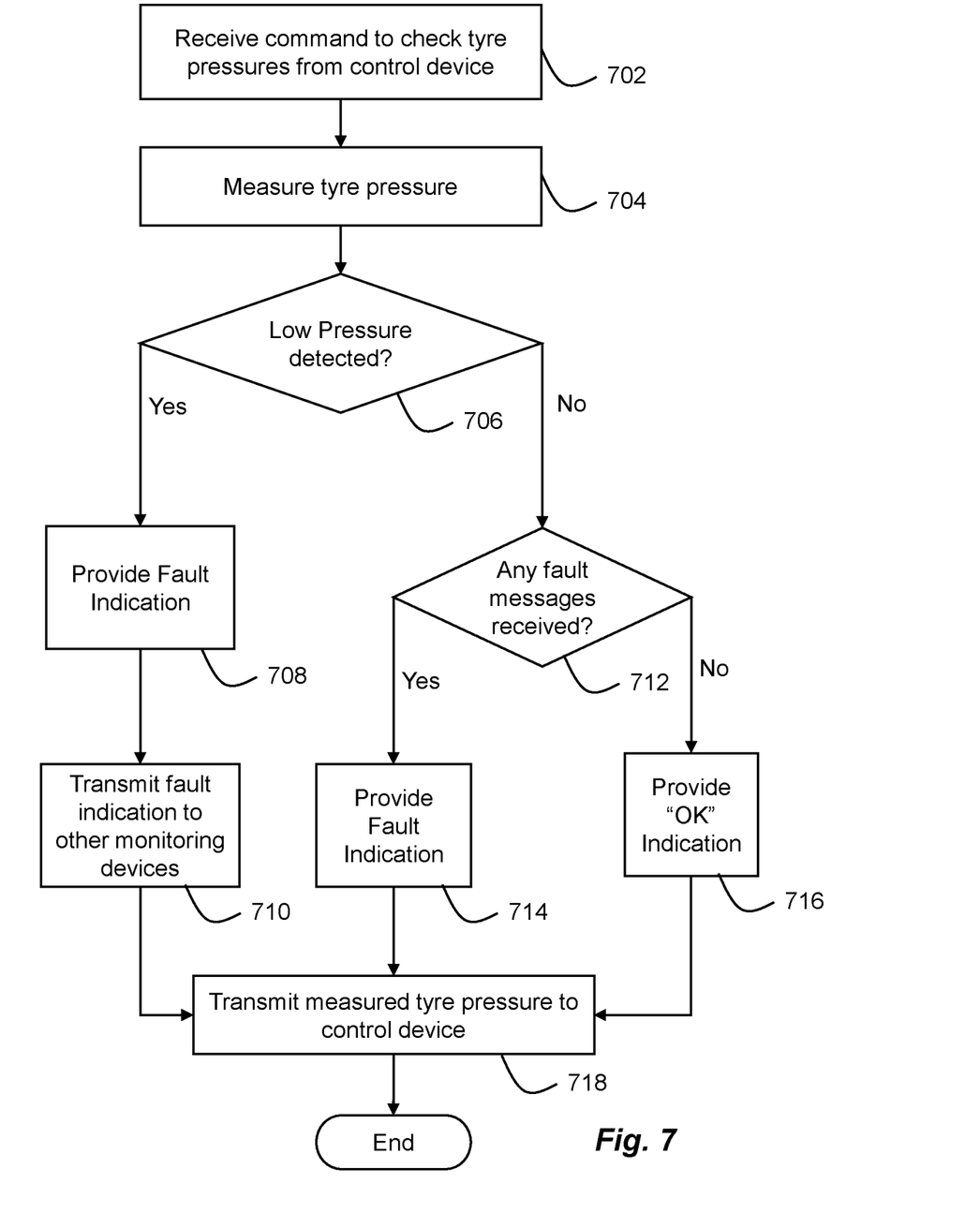
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Initialisation of Tyre Monitoring Devices

In one example, the tyre monitoring device may be capable of operating in two modes: a first, low power mode, and a second, higher power mode, wherein the low-power mode is configured to restrict the operation of the tyre monitoring device such that its power consumption is reduced versus when operating in the second higher-power mode.

Before installation onto the wheel of a vehicle, such as the aircraft of FIG. 5, the tyre monitoring device may be stored or kept in the low power mode. Operating in the low power mode ensures that when the device is not in use, such as before it is installed on a wheel of a vehicle, less energy is consumed from its power source. This has the benefits of maximising the usable life of the tyre monitoring device when the power source is not replaceable or rechargeable. In some examples, operating in the low power mode can also increase the security of the device during storage by preventing third party devices maliciously interacting with tyre monitoring devices which have yet to be initialised.

Figure 8:
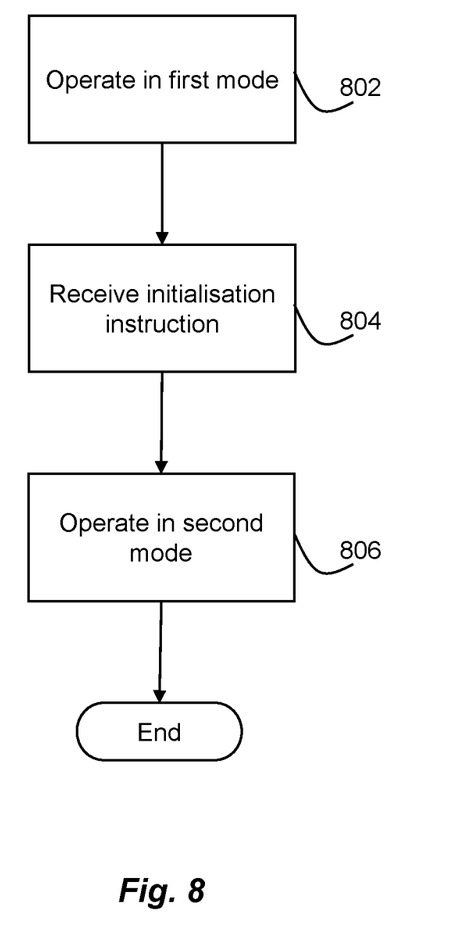
FIG. 8 shows a flow chart of initialisation process for a tyre monitoring device, that can be used with the example of FIG. 1.

FIG. 8 shows a flow chart of an initialisation process for a tyre monitoring device, such as the tyre monitoring device described above in relation to FIG. 2, to cause the device to transition from a first, low-power storage mode to a second, normal operation mode. The process of FIG. 8 may be used prior to the fitting of the tyre monitoring device to a vehicle, or alternatively after the tyre monitoring device has been fitted to the wheel of a vehicle, such as the aircraft of FIG. 5.

First, at block 802, the tyre monitoring device is operating in a first mode. Operation in the first mode may be determined the contents of the storage. For example the device may operate in the first mode if the contents of the storage are null or invalid, indicating that the device has not yet been configured for use.

The first mode is a low power mode, whereby the operation and functionality of the device is limited. As mentioned above, and with reference to the tyre monitoring device of FIG. 2, the wireless communication interface of the tyre monitoring device may comprise two transceivers, each using a different wireless technology. When operating in the first, low power mode, the tyre monitoring device may be configured to operate the transceiver with the lowest power draw. For example, when in the first mode, a short-range transceiver such, as an RFID or NFC transceiver may be used. When in the first mode, power may only be provided to the transceiver capable of communication using a low-power wireless communication protocol. Such protocols typically have shorter range than higher power wireless communication protocols, for example the range may be less than 50 cm, less than 25 cm, less than 10 cm, less than 5 cm, less than 1 cm or requiring contact between devices. This will prevent the tyre monitoring device communicating the other wireless communication protocols which have higher power requirements, thereby reducing the power consumption of the device when in the first mode. Because the potential range of communication is short, the risk of accidental initialization of other devices (for example other unused devices stored in a maintenance facility) is low.

In some examples a low-power wireless communication protocol operates in a passive manner, that is, it does not require the device to be powered in order to receive instructions from a secondary device. For example, communication using a short-range wireless communication protocol, such as RFID or NFC, may provide sufficient energy in the transmitted instruction to power up the receiving transceiver. In this case, the storage mode may provide no power to any component of the tyre monitoring device because the initialization instruction may cause the transceiver to power up and cause initialization of the tyre monitoring device, including activating other components to receive power from the power supply.

More generally, when in the first, low power mode, power may not be provided, or may be restricted, to other components of the tyre monitoring device. For example, power may not be provided to the pressure sensor or the indicator, or certain functionality may be prevented, such as measurement functions. In yet another example, when in the low-power mode, at least some of the components of the tyre monitoring device are in a low-power state. This may include a processor being in low-powered sleep mode, or an operation counter or which has not yet been started. This enables reduced operation in the storage mode, whilst limiting the device's ability to undertake more power intensive operations. Only those systems required to receive the initialization instruction may be powered. For example, only the transceiver to receive the initialization instruction may be powered, so that the transceiver can then wake the other components. In this case the transceiver may itself be in a low power state, for example operated periodically to listen for an initialization instruction, perhaps once every 500 ms, 1 second, 10 seconds or minute.

By limiting the power made available to components in the storage mode, this ensures that power consumption is minimised whilst in the low-power mode. As a further advantage, the low power mode prevents unnecessary operations from being executed which might create a further power draw, and also increases security by limiting such operations until an initialisation instruction has been received by the tyre monitoring device.

Next, at block 804, an initialisation instruction is received by the tyre monitoring device. The initialisation instruction is received from a second device, such as the control device or configuration device described above in relation to FIGS. 1, 3 and 4. The initialisation instruction is sent from the second device to the tyre monitoring device using a short-range wireless communication protocol, such as NFC or RFID. This initialisation instruction is received by the tyre monitoring device at a transceiver of the wireless communication interface. In some examples, other instructions may be received while the tyre monitoring device is in the low-power storage mode, because other instructions than an initialization instruction may be transmitted over the same short range wireless communication protocol. The tyre monitoring device may take no action in response to such commands while in the storage mode.

Following receipt of the initialisation instruction, at block 806, the tyre monitoring device enters a second, higher-power, mode corresponding to normal operation. The second mode is the general operational mode of the device, described above. In this mode the operation of the device is not limited and the device is responsive to received instructions over the wireless communication interface. As such the tyre monitoring device is able to receive instructions via a second wireless communication protocol having a higher power draw than the first wireless communication protocol. In one example the second wireless communication protocol may be any active wireless communication protocol.

The receipt of the initialisation instruction causes the device to enter the second mode or normal operation mode. As mentioned above, the tyre monitoring device comprises other components, such as a processor. When the tyre monitoring device is in the low-power mode, these components may operate in a low-power or dormant state. The initialisation instruction serves to indicate to such components that they are to transition into a normal operational mode. In the case of the processor, the initialisation instruction may serve as an interrupt which awakens the processor, and enables it to instruct other components of the tyre monitoring device to enter the operational mode. In another example, the initialisation instruction may cause power to be provided to other components of the tyre monitoring device which, in the low-power mode, were not receiving power. Such components may include the pressure sensor, temperature sensor and indicator, although other components of the tyre monitoring device may also be included.

The second mode or normal operation mode may itself comprise a power saving mode, for example when no measurement is required the device may be in a lower power state than when a measurement, such as pressure and/or temperature measurement, is being taken. However, this is different from the storage mode because the device is responsive to commands other than an initialization command, for example a measurement command may be received in the power saving mode and acted upon.

When in the second mode or normal operation mode, if a failure or fault of one or more components of the tyre monitoring device is detected, such as a loss of memory configuration, the tyre monitoring device may return to the first mode or low-power mode, thereby limiting certain operations such as the transmission and/or receipt of long-range communications.

In some examples the initialization at block 806 causes an operation counter in the tyre monitoring device to be initialized and to periodically increment a count representing the time the tyre monitoring device has been in the second mode. For example, the operation counter may increment a count once per millisecond, once per second, once per 10 seconds, once per 30 seconds or once per minute. In this way the operation counter can provide a means to determine the time the tyre monitoring device has been operative in the second mode. The initialization of the operation counter comprises setting an initial value of the counter, such as setting it to zero.

In some examples, it is not possible for the tyre monitoring device to return to the first, low-power or storage mode once it has entered the second normal mode of operation. This may allow the operation counter to provide an accurate estimate of the remaining service lifetime of the tyre monitoring device. For example, a battery of the tyre monitoring device may be designed to have sufficient power to power the device for a predetermined time in the storage mode and a predetermined time in the normal mode, but the technology of the battery may be such that directly monitoring the amount of energy remaining in the battery is difficult. The operation counter can provide an indication of remaining battery life because the predetermined service life is known, but this may not work if the device can be returned to storage mode from the normal mode causing the operation counter to be reinitialized. For example, the storage mode may only be operative during manufacture of the device, or to be operative only when a power supply is first connected. This could be determined by examining the contents of the storage, which will generally be empty or contain invalid data (such as random data) following manufacture.

In some examples the initialization at block 806 causes a storage counter in the tyre monitoring device to be disabled. The storage counter periodically increments a count representing the time the tyre monitoring device has been in the first mode. For example, the storage counter may increment a count once per millisecond, once per second, once per 10 seconds, once per 30 seconds or once per minute. In this way the storage counter can provide a means to determine the time the tyre monitoring device has been operative in the first mode. Disabling the storage counter stops the storage counter incrementing, and in some examples may comprise setting an initial value of the storage counter, such as setting it to zero. This allows the storage counter to provide an accurate estimate of the amount of time the tyre monitoring device has been in the first mode.

Figure 9:
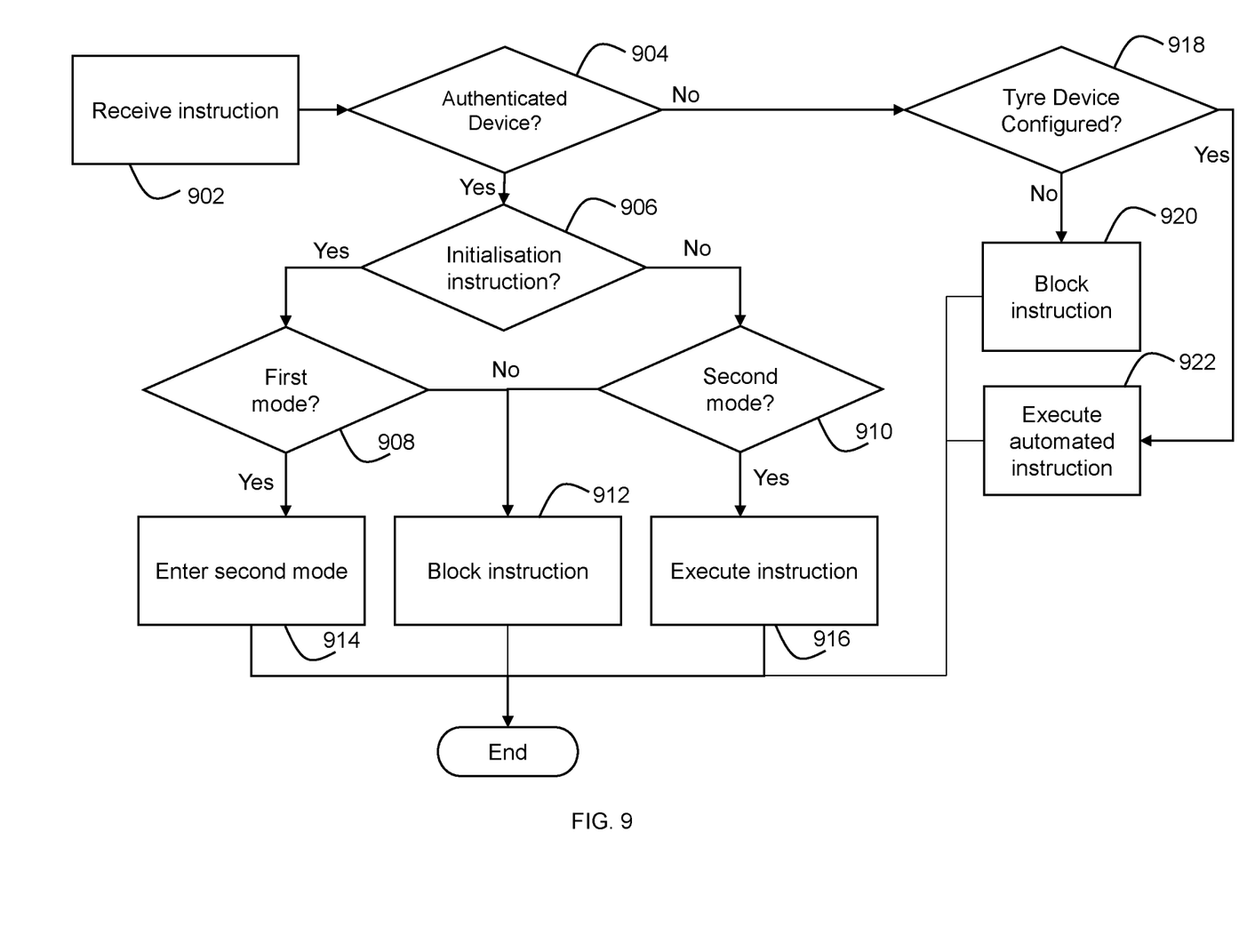
FIG. 9 shows a flow chart of the process of receiving an instruction at a tyre monitoring device, that can be used with the example of FIG. 1.

FIG. 9 shows a flow chart of the process of receiving an instruction at a tyre monitoring device, that can be used with the example of FIG. 1. First at block 902, an instruction is received at the tyre monitoring device. The instruction is received via the wireless communication interface from a second device. At block 904, it is determined whether the second device is a trusted device, such as an authenticated or genuine device. For example an identifier, such as a MAC address, can be compared to a database of trusted devices. In other examples trust may be determined by being able to decrypt a communication sent from the second device. Both examples provide a way ensure that the second device is a genuine, trusted or authenticated device authorised for communication with the tyre monitoring device, however it will be appreciated that other methods can be used. If it is determined that the second device is a trusted device, the yes branch is followed to block 906. If it is determined that the second device is not a genuine authenticated device, then the no branch is followed to block 918.

At block 906, it is determined whether the instruction is an initialisation instruction. If it is determined to be an initialisation instruction, the yes branch is followed to block 908. If it is determined that the received instruction is not an initialisation instruction, then the no branch is followed to block 910.

At block 908 it is determined whether the tyre monitoring device is in the first, low-power mode. If in the low-power mode, then the yes branch is followed to block 914, if not then the no branch is followed to block 912.

At block 910, if the instruction received is not an initialisation instruction, then it is determined whether the tyre monitoring device is in the operational mode. If in the operational mode, then the yes branch is followed to block 916, if not, then the no branch is followed to block 912.

At block 914, when the initialisation instruction is received in the low-power mode, then the tyre monitoring device is instructed to enter the operational mode. As mentioned above with reference to FIG. 8, this may cause power to be provided to other components of the tyre monitoring device, as well as enable communication via the wireless communication interface over a wireless communication protocol which has a higher power requirement.

At block 912, instructions are blocked and/or prevented from being executed. This occurs when an instruction, which is not an initialisation instruction is received by the tyre monitoring device while operating in the first, low-power or storage mode. This prevents the tyre monitoring device from executing normal operation instructions when it is not initialised. Initialisation instructions are also blocked from execution if the tyre monitoring device is in the operational mode. This prevents the tyre monitoring device from executing initialisation instructions when already initialised. This has the benefit of increasing security as it means that a third party and/or malicious user are unable to re-initialise/overwrite existing settings on the device.

At block 916, the normal operation instructions are executed when in the second mode. This enables the device to be in a normal operating state, and function as described above in relation to FIG. 6, for example.

At block 918, when it has been determined that the second device is not an authenticated device, it is determined whether the tyre monitoring device has been previously configured, for example by checking for the presence of configuration information, such as reference tyre pressures, stored in the tyre monitoring device. If so, then the yes branch is followed to block 922, if not then the no branch is followed to block 920.

At block 920, instructions are blocked and/or prevented from being executed. This occurs when an instruction is received by an unconfigured tyre monitoring device from a second device which is not authenticated/genuine. This prevents the tyre monitoring device from executing the instruction when it has not been configured. This has the benefit of increasing security as it means that a third party using a device which has not been authenticated is prevented from sending instructions to a device which has yet to be configured.

At block 922, when an instruction is received by a configured tyre monitoring device from a second device which is not authenticated/genuine, the tyre monitoring device may be arranged to execute an automated instruction. For example, the tyre monitoring device may provide an indication to a user that they are using a second device which has not been authenticated. The indication can take several forms, for example a response sent to the second device or by using the indicator on the tyre monitoring device itself, such as by turning a visual indicator a predetermined colour other than red or green.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. An aircraft tyre monitoring device configured to be mounted on a wheel of a vehicle, the tyre monitoring device comprising:
   a wireless communication interface;
   an indicator;
   a pressure sensor;
   a temperature sensor;

a processing system; and
a power supply;
wherein the tyre monitoring device is configured to:
operate in a storage mode in which at least one of the indicator, the pressure sensor; the temperature sensor and the processing system cannot be used and the tyre monitoring device is only responsive to an initialization instruction received over the wireless communication interface; and
operate in a normal mode in response to the initialization instruction, wherein in the normal mode, the indicator, the pressure sensor; the temperature sensor and the processing system can be used and the tyre monitoring device is responsive to instructions received over the wireless communication interface, the storage mode having a lower power requirement than the normal mode.

2. The aircraft tyre monitoring device according to claim 1, wherein the wireless communication interface comprises:
a first wireless communication interface operative in both the storage mode and the normal mode and having a communication range of less than 10 cm; and
a second wireless communication interface operative only in the normal mode and having a communication range of at least 20 m, wherein the first wireless communication interface has a lower energy requirement than the second wireless communication interface.

3. The aircraft tyre monitoring device of claim 1, further comprising a counter, and wherein the tyre monitoring device is configured to:
not power the counter in the storage mode;
power the counter in the normal mode; and
responsive to the initialization instruction, initialize the counter.

4. The aircraft tyre monitoring device of claim 1, further comprising a counter, and wherein the tyre monitoring device is configured to:
power the counter in the storage mode;
not power the counter in the normal mode; and
responsive to the initialization instruction, disable the counter.

5. The aircraft tyre monitoring device of claim 1, wherein the aircraft tyre monitoring device cannot return to operation in the storage mode once it is operating in the normal mode.

6. The aircraft tyre monitoring device of claim 1, wherein when the tyre monitoring device is operating in the normal mode, the aircraft tyre monitoring device returns to operation in the storage mode upon detection of a fault.

7. A tyre monitoring system comprising:
a plurality of tyre monitoring devices, each comprising:
a wireless communication interface;
an indicator;
a pressure sensor;
a temperature sensor;
a processing system; and
a power supply; and
a configuration device comprising a wireless communication interface;
wherein each tyre monitoring device of the plurality of tyre monitoring devices is configured to:
operate in a storage mode in which at least one of the indicator, the pressure sensor; the temperature sensor and the processing system cannot be used and the tyre monitoring device is only responsive to an initialization instruction received over the wireless communication interface sent by the configuration device; and operate in a normal mode in response to the initialization instruction, wherein in the normal mode, the indicator, the pressure sensor; the temperature sensor and the processing system can be used and the tyre monitoring device is responsive to instructions received over the wireless communication interface, the storage mode having a lower power requirement than the normal mode.

8. The tyre monitoring system according to claim 7, wherein the wireless communication interface comprises:
a first wireless communication interface operative in both the storage mode and the normal mode and having a communication range of less than 10 cm; and
a second wireless communication interface operative only in the normal mode and having a communication range of at least 20 m, wherein the first wireless communication interface has a lower energy requirement than the second wireless communication interface.

9. The tyre monitoring system of claim 7, further comprising a counter, and wherein each of the plurality of tyre monitoring devices is configured to:
not power the counter in the storage mode;
power the counter in the normal mode; and
responsive to the initialization instruction, initialize the counter.

10. The tyre monitoring system of claim 7, further comprising a counter, and wherein each of the plurality of tyre monitoring devices is configured to:
power the counter in the storage mode;
not power the counter in the normal mode; and
responsive to the initialization instruction, disable the counter.

11. The tyre monitoring system of claim 7, wherein each of the plurality of aircraft tyre monitoring devices cannot return to operation in the storage mode once it is operating in the normal mode.

12. The tyre monitoring system of claim 7, wherein when a given tyre monitoring device of the plurality of tyre monitoring devices is operating in the normal mode, the given tyre monitoring device returns to operation in the storage mode upon detection of a fault.

13. A method for initializing the tyre monitoring device of claim 1, comprising:
operating the tyre monitoring device in a first mode, wherein in the first mode the tyre monitoring device is only responsive to an initialization instruction received over the wireless communication interface from the second device;
receiving an initialization instruction over a wireless communication interface while operating in the first mode; and
responsive to the initialization instruction operating the tyre monitoring device in a second mode in which the tyre monitoring device is responsive to instructions received over the wireless communication interface;
wherein the first mode draws lower power than the second mode.

14. The method of claim 1, further comprising, when operating in the first mode, restricting power to at least one component of the tyre monitoring device.

15. The method of claim 14, wherein restricting power comprises providing no power to the at least one component.

16. The method of claim 13, wherein the tyre monitoring device comprises a counter and, when operating in first mode, the counter is not powered, the method further comprising initializing the counter responsive to the initialization instruction and powering the counter in the second mode.

17. The method of claim 13, wherein the tyre monitoring device comprises a counter and, when operating in the first mode, the counter is powered, the method further comprises stopping the counter responsive to the initialisation instruction.

18. The method of claim 13 wherein, when operating in the first mode, the initialization instruction is received using a first wireless communication protocol and, when operating in the second mode, the instructions are received using a second wireless communication protocol, wherein the first wireless communication protocol has a lower energy requirement than the second wireless communication protocol.

19. The method of claim 18, wherein the first wireless communication protocol is a passive wireless communication protocol and the second wireless communication protocol is an active wireless communication protocol.

20. The method of claim 18, wherein the first wireless communication protocol uses a first wireless communication interface and the second wireless communication protocol uses a second wireless communication interface.

21. The method of claim 13, wherein when in the first mode, the wireless communication interface has a communication range of less than 10 cm and the second mode the wireless less communication interface a communication range of at least 20 m.

22. The method of claim 13, wherein, once the tyre monitoring device is operating in the second mode, it is not possible for the tyre monitoring device to return to operating in the first mode.

23. The method of claim 13, further comprising when the tyre monitoring device is operating in the second mode, returning to operating in the first mode responsive to detection of a fault in the tyre monitoring device.

24. An aircraft tyre monitoring device comprising:

a wireless communication interface; and a processing system configured to execute the method of claim 13.

* * * * *